Figure 1:
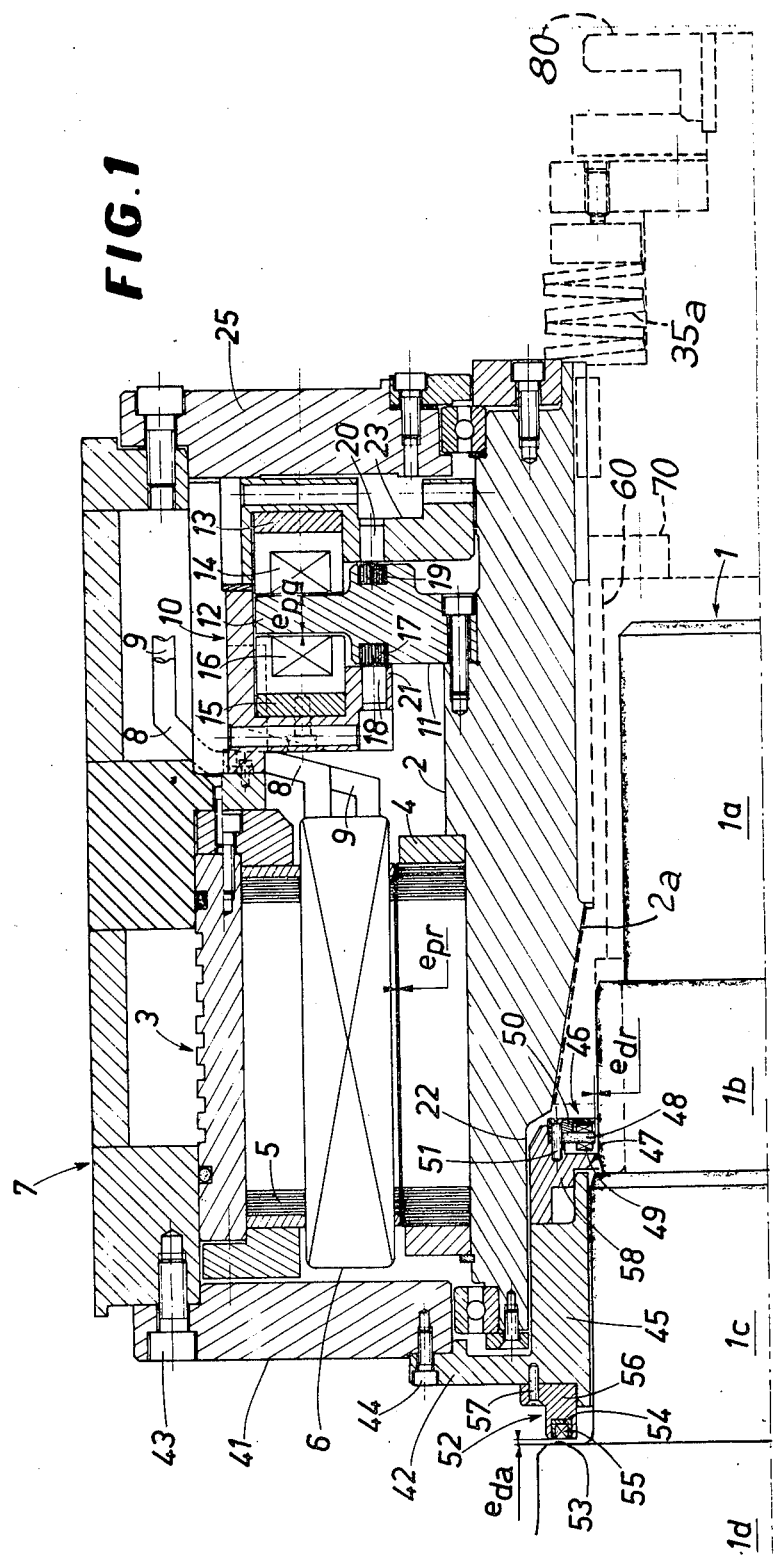

United States Patent [19]

Brunet

[11] 4,302,061
[45] Nov. 24, 1981

[54] REMOVABLE MAGNETIC SUSPENSION SYSTEM

[75] Inventor: Maurice Brunet, Vernon, France

[73] Assignee: Societe Europeenne de Propulsion, Puteaux, France

[21] Appl. No.: 87,888

[22] Filed: Oct. 24, 1979

Related U.S. Application Data

[63] Continuation-in-part of Ser. No. 867,225, Jan. 6, 1978, abandoned.

[30] Foreign Application Priority Data

Jan. 13, 1977 [FR] France .................................. 77 0092

[51] Int. Cl.$^3$ .............................................. F16C 39/06
[52] U.S. Cl. ................................................... 308/10
[58] Field of Search ........................................ 308/10

[56] References Cited

U.S. PATENT DOCUMENTS

| | | | |
|---|---|---|---|
| 3,787,100 | 1/1974 | Habermann et al. | 308/10 |
| 3,955,858 | 5/1976 | Poubeau | 308/10 |
| 4,121,143 | 10/1978 | Habermann | 308/10 |

FOREIGN PATENT DOCUMENTS

| | | | |
|---|---|---|---|
| 2149644 | 3/1973 | France | 308/10 |
| 1257423 | 12/1971 | United Kingdom | 308/10 |
| 1382300 | 1/1975 | United Kingdom | 308/10 |
| 1392210 | 4/1975 | United Kingdom | 308/10 |
| 1422282 | 1/1976 | United Kingdom | 308/10 |
| 1424071 | 2/1976 | United Kingdom | 308/10 |
| 1424072 | 2/1976 | United Kingdom | 308/10 |

Primary Examiner—R. Skudy
Attorney, Agent, or Firm—Eyre, Mann, Lucas & Just

[57] ABSTRACT

A removable magnetic suspension system for a rotor comprising at least one electromagnetic bearing constituted by an armature supported by a sleeve fast with the rotor and a stator mounted on a fixed support, and at least one electromagnetic rotor-position detector constituted by a fixed stator cooperating with a part forming an armature integral with the rotor for controlling the bearing characterized in that the detector is mounted independently of the bearing which it controls and comprises a stator removably mounted on a fixed support and disposed directly opposite a reference surface formed on the rotor and independent of the sleeve supporting the bearing armature.

9 Claims, 6 Drawing Figures

REMOVABLE MAGNETIC SUSPENSION SYSTEM

This is a continuation-in-part of U.S. application Ser. No. 867,225, filed on Jan. 6, 1978 now abandoned, claiming priority from French application Ser. No. 7700921 filed Jan. 13, 1977.

This invention relates to a dismountable magnetic suspension system for a rotor of the type comprising at least one electromagnetic bearing constituted by an armature supported by a sleeve removably fast on the rotor and a stator mounted opposite the armature on a fixed support, and at least one electromagnetic, rotor-position detector constituted by a fixed stator cooperating with a part forming an armature integral with the rotor to control the bearing.

It is known removably to mount by such bearings a rotor inside a frame. Thus, in finishing lathes, for example, a shaft is temporarily mounted on magnetic bearings to allow high precision working. Such working must be done, for example, on printing rollers which will eventually be mounted in roller bearings for printing purposes but which having been engraved must be finished to give a perfectly regular curve. This finishing operation is effected by a lathe in which the printing roller is mounted by a dismountable magnetic suspension.

In known magnetic suspension systems, each electromagnetic bearing comprises a stator fixed to a frame and a mobile armature fast with a sleeve engaged on the end of the rotor. The electromagnetic detector serving to control the bearing is itself mounted alongside the bearing which it sontrols and comprises a fixed stator arranged opposite an armature fast with the sleeve. Such an arrangement has drawbacks. Indeed, the removable sleeve of the bearing is always engaged on the rotating shaft slightly inprecisely. Errors in centering or fixing the bearing are of relatively limited importance insofar as there is no contact between stator and rotor but this does not hold good for the detector which must not transmit erroneous indications of the rotor position. Consequently, a mounting such as described above in which the detectors associated with the bearings act in cooperation with the removable sleeve is not satisfactory.

The present invention obviates or mitigates the aforesaid drawbacks by providing a removable magnetic suspension in which the detection of the rotor position is improved.

This is achieved by a suspension system for a rotor of the type described above in which, according to the invention, the detector is mounted independently of the bearing it controls and comprises a stator removably mounted on a fixed frame and arranged directly opposite a reference surface formed on the rotor and independently of the sleeve carrying the armature of the bearing.

The bearing and associated detector can be radial or axial.

The invention applies equally to a mounting comprising one or more radial bearings and one or more axial bearings associated respectively with one or more radial or axial detectors. In this case, each detector is mounted independently of the bearing it controls and each detector comprises a stator removably mounted on a fixed support and disposed directly opposite an annular reference surface formed on the rotor itself.

Thus, according to the invention, the detectors cooperate directly with the rotor and more precisely with a reference surface on the rotor so that a substantial precision in the detection of the position of the rotor is ensured.

In one embodiment, the cylindrical reference surface associated with a radial detector is constituted by a finished surface portion already formed on the peripheral portion of the rotor and intended to be received for example in a roller bearing.

Thus, the reference surface selected for a detector need not necessarily be formed exclusively with a view to mounting an electromagnetic bearing associated with a detector but can equally serve to be mounted in a more conventional bearing such as for example a roller bearing.

According to an embodiment of the invention, an annular reference surface associated with an axial bearing and formed in a radial plane of the rotor is constituted by a shoulder formed on the rotor. This annular plane surface can be constituted by the end o the rotor.

It is advantageous, though it is not indispensable, that a radial detector be disposed below the sleeve carrying the armature of the radial bearing controlled by the detector substantially in the same radial position as the radial bearing.

Figure 2:
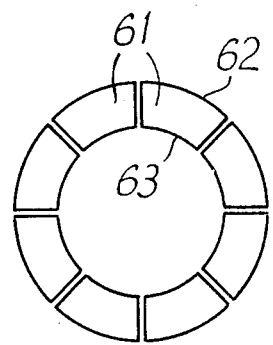
Figure 3:
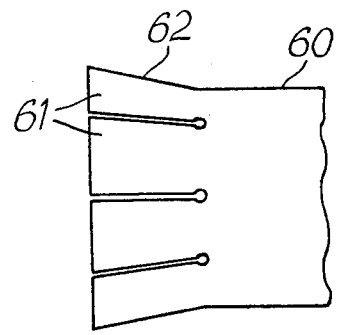
Figure 4:
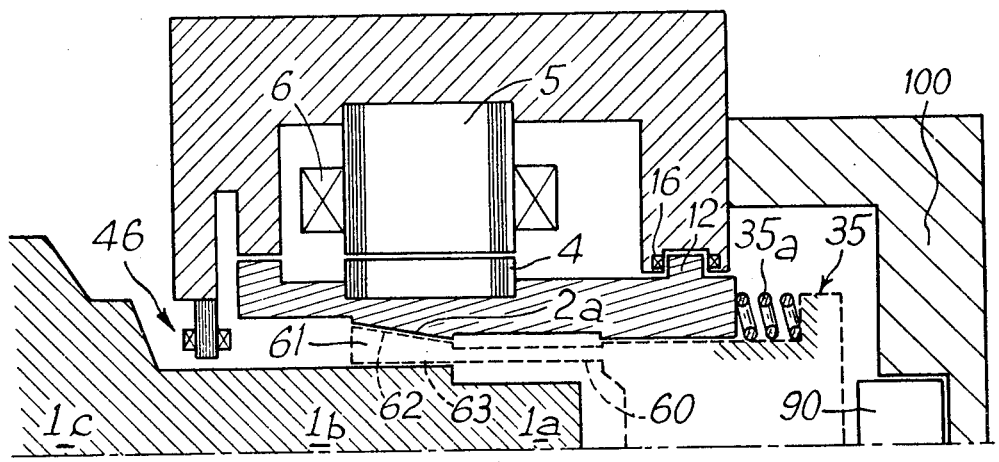
Figure 5:
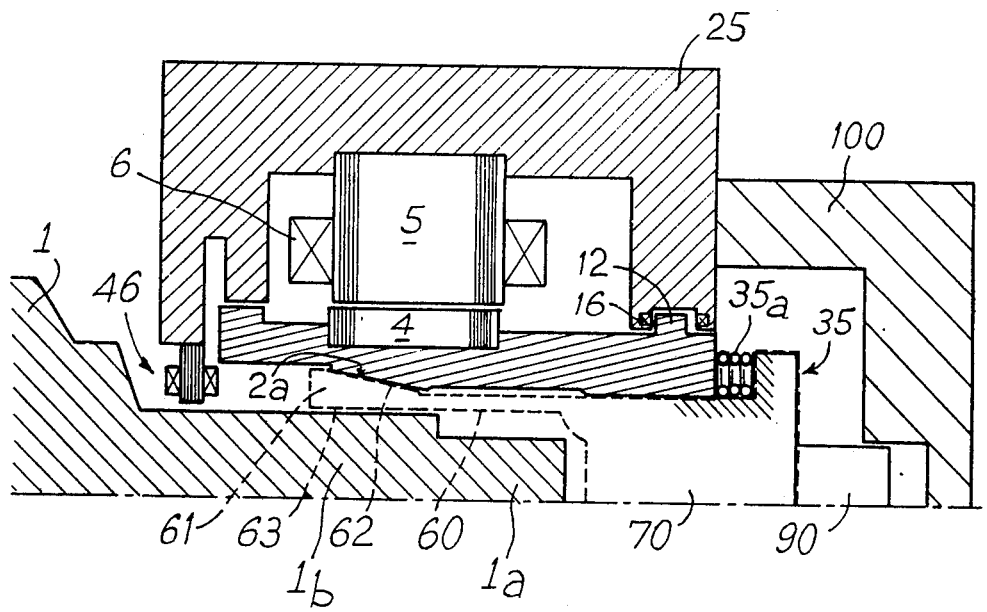
Figure 6:
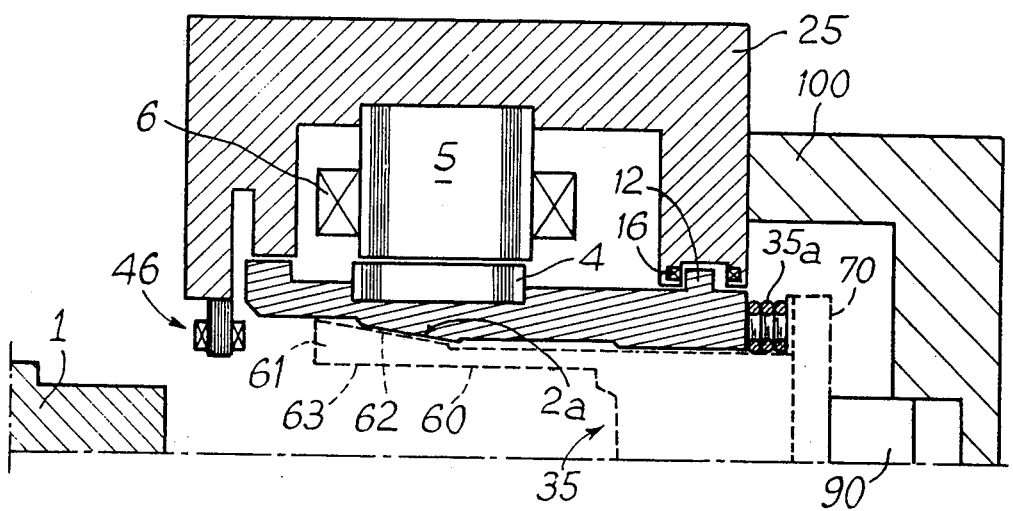

An embodiment of the present invention will now be described, by way of example, with reference to the accompanying drawing, wherein:

FIG. 1 is a half-sectional longitudinal view of a rotor mounted on active electromagnetic bearings according to the invention, FIG. 2 is a view in end elevation showing the front portion of a gripper which is intended removably to mount a sleeve on the end portion of a rotor, FIG. 3 is a fragmentary detail view in side elevation of the front portion of the gripper shown on FIG. 2, FIG. 4 is a diagrammatic view showing a magnetic suspension according to the invention, wherein the sleeve is clamped on a shaft, FIG. 5 is a diagrammatic view showing a magnetic suspension, wherein the sleeve is disconnected from the shaft, FIG. 6 is a diagrammatic view showing the whole magnetic suspension removed from the shaft.

Referring to FIG. 1, a sleeve 2 supporting one part of an electromagnetic bearing is mounted on the end portion of a shaft 1. The shaft 1 is shown in known manner in different successive portions $1a$, $1b$, $1c$, $1d$, whereof the respective diameters can be slightly increased starting from end portion $1a$ which is smallest.

The sleeve 2 is fitted on an end of the shaft 1 and is maintained in position by a gripper 35 the function of which will be explained later with reference to FIGS. 2 to 6. The sleeve 2 supports on its external face the armature 4 of a radial bearing 3 the stator 5,6 of which is integral with a fixed frame 7, and surrounds and is spaced from the armature 4 by a small distance $e_{pr}$. The stator 5, 6 comprises a core 5 and winding 6 with two supply conductors 8, 9.

A disc 11 is fixed on the sleeve 2 and has a peripheral part 12 constituting the armature of an axial bearing 10. The armature 12 cooperates with two stators on opposite sides of the armature 12 and spaced a small distance $e_{pa}$ from the latter. Each stator 13, 15 has a winding 14, 16. The stator 13, 14, and 15, 16 are fixed on the fixed frame 7.

The axial bearing 10 may naturally comprise only one stator, say 13, 14, coaxial with the axis of shaft 1.

Axial electromagnetic detectors may be disposed, in known manner, immediately adjacent the axial bearing 10. Thus, the annular seatings 18 and 20 formed respectively in fixed members 21 and 22, supporting the stators of bearing 10 can accomodate detector stators cooperating with annular armatures 17, 19 of ferromagnetic sheet material respectively which are incorporated in the disc 11 opposite the seatings 18 and 20 respectively.

Similarly, a detector for the radial position of the rotor 1 could be located immediately adjacent the radial bearing 3 and comprise a fixed stator associated with an armature integral with sleeve 2. However, such embodiments would be relatively inaccurate, since the sleeve 2 is engaged on the shaft 1 with certain centering errors and consequently the surfaces connected to the sleeve 2 and forming the detector armature do not provide an exact reference for rotor position.

According to the invention, a radial electromagnetic detector 46 is mounted independently of the sleeve 2 to cooperate directly with a finished surface 47 of rotor 1. The detector 46 comprises a stator 48, 49 comprising a sheet iron core 48 and a winding 49 mounted on a support 50. The reference surface 47 which is constituted by a cylindrical trued surface portion of the rotor periphery serves as an armature for the detector 46 and is spaced from the stator 48,49 by a distance $e_{dr}$. The trued surface 47 may be destined eventually to be housed in a roller bearing when the bearing 3 has been removed and shaft 1 installed in its required installation position.

The member 50 supporting armature 48,49 of the radial detector 46 is fixed by a connector 51 on a ring 58 mounted on the end of a member 45 fixed to frame 7 by intermediate elements 41. The assembly 41, 45, 58, to the end of which is secured the detector 46 may be released from the frame 7 by unscrewing bolts 43, 44 when the sleeve 2 is released.

In one advantageous embodiment, as illustrated, the detector 46 is disposed under the sleeve 2 below the radial bearing 3 so that the latter and detector 46 are in closely adjacent radial planes. The sleeve 2 has a reduced thickness in zone 22 so as to provide a free space between rotor 1 and sleeve 2 and permit location of detector 46 opposite surface 47 without contact between the member supporting the fixed stator 48, 49 and sleeve 2.

An axial electromagnetic detector 52 for controlling axial electromagnetic bearing 10 is mounted independently of the sleeve 2 opposite a reference surface 53 of rotor 1. The plane annular surface 53 perpendicular to the rotor axis is constituted by a shoulder formed at the junction between two rotor portions 1c and 1d. The surface 53 is trued up and constitutes the armature of the axial detector 52 which is spaced a distance $e_{da}$ from the detector stator formed by an annular core 54 provided with a winding 55. The stator 54, 55 is incorporated in a support 56 removably mounted by a connector 57 on a member integral with the frame 7. The support 56 can itself be mounted on a part 42 of a member such that the member which contributes to the support of the stator of radial detector 46.

Thus the radial detectors 46 and 52 have stators removably fixed on the fixed frame 7 independently of the bearings they control and disposed directly opposite reference surfaces 47, 53 respectively formed on the rotor 1. The detectors 46 and 52 precisely determine the rotor position whatever the errors in the positioning of the sleeve 2 removably secured to the end of the rotor.

The structure of the stators of the bearings and detectors do not form part of the invention. For example, the annular stators 13, 14, 15, 16; 54, 55 of axial bearing 10 and axial detector 52 comprise a ferromagnetic body 13, 15, 54 coaxial with the shaft 1 and an excitation winding 14, 16, 55. The radial bearing 3 comprises a stator 5, 6 whereof the core 5 is formed by a pole piece or an iron core on which is mounted a set of windings 6.

Constitution of the stator of radial detector 46 is advantageously that disclosed in U.S. Pat. No. 4,114,960. The excitation current of winding 6 of radial bearing 3 is controlled by signals delivered by the detector 46. The control of bearing 3 by detector 46 can be effected by circuits as disclosed in U.S. Pat. No. 3,787,100. Naturally, it is possible to operate several detectors such as detector 46, different detectors being mounted in a manner so as to cooperate with reference surfaces on rotor 1, the stators being removably mounted on the frame 7.

The electric cables going to windings 49, 55 of detectors 46 and 52 respectively, not shown in the drawings, are introduced into tubular cavities provided in members 58, 56 and 45.

The figure shows a magnetic suspension removably mounted on one end of the rotor but it will be manifest that a rotor can be supported at each end by such a suspension.

Various modifications may be made without departing from the scope of the accompanying claims.

For example, it often appears that harmful effects due to synchronous parasitic perturbations arising out an imbalance arising from the fact that the rotor 1 is not mounted in bearing 3 such that its axis of inertia coincides exactly with the axis of rotation of the bearings. It is possible to reduce these harmful effects, to control the bearings such as 3 by detectors such as 46 and control circuits such as are disclosed in U.S. Pat. No. 4,121,143.

Gripper 35 maintains the sleeve 2 in engagement with the end portion 1b, 1a of a rotating shaft 1. Gripper 35 could exhibit the configuration of a conventional grip used to removably mount a tool on the rotating shaft of a lathe, a drilling machine, or the like.

More specifically, (see FIGS. 2 and 3), gripper 35 could comprise a plurality of jaws 61 capable of being tightened on the shaft 1 and defining a conical portion 62 cooperating with a corresponding conical portion 2a of the sleeve 2. The sleeve 2 is fitted on the conical portion 62 of the gripper 35 interposed between the shaft 1 and the sleeve 2. Resilient means 35a allow the gripper 35 to be disconnected from the shaft 1 and the sleeve 2 so that the latter can be removed from the shaft.

Gripper 35 which is shown in dotted lines on FIGS. 1 and 4 to 6 essentially comprises a slotted tube 60 which defines a plurality of jaws 61. The tube 60 is inserted between sleeve 2 and shaft 1. The sleeve 2 has a conical inner portion 2a whereas tube jaws 61 exhibit a conical outer portion 62 cooperating with the portion 2a of sleeve 2. Tube jaws 61 exhibit a cylindrical inner portion 63 cooperating with the shaft 1. In operation (FIG. 4) tube 60 is inserted between sleeve 2 and shaft 1 so that sleeve 2 is jammed on shaft 1. Sleeve 2, gripper 35 with slotted tube 60, resilient means 35a, and shaft 1 rotate together. Grips are commonly used to tighten a cylindrical work piece in a tool holder of a machine tool. Gripper 35 could be constituted by a conventional grip comprising a plurality of jaws 61 having a conical outer reference surface 62 and a cylindrical inner reference surface 63. The slotted tube 60 is preferably threaded and can be axially displaced by means of a coaxial threaded tube 70 integral with a hand-wheel 80 (FIG. 1) On FIGS. 1 and 4, tube 60 has been axially displaced to the right with respect to tube 70 of gripper 35 so that conical jaws 61 are put in engagement both with conical inner portion 2a of sleeve 2 and cylindrical surface of shaft portion 1b, thus clamping sleeve 2 and shaft 1 together. Gripper 35 is maintained in engagement with sleeve 2 and shaft 1 by resilient means 35a.

FIG. 5 shows gripper 35 which has been disengaged from sleeve 2 and shaft 1 thus disconnecting sleeve from shaft 1. Hydraulic jack 90 mounted on a fixed frame 100 integral with frame 25 urges the rear portion 70 of gripper 35 against resilient means 35a, and moves tube 60 to the left so that the end portion 1a, 1b of the shaft 1 is disconnected from the sleeve 2.

FIG. 6 shows the whole magnetic suspension which has been moved to the right on a slide (not shown) so that shaft 1 is easy to carry away and another shaft can be brought and mounted on the removable magnetic suspension.

What is claimed is:

1. A removable suspension system for a rotor that revolves with respect to a stationary assembly, comprising:
    (a) a sleeve removably engaged on said rotor and maintained selectively affixed thereto by gripper means;
    (b) at least one electromagnetic bearing including a bearing armature supported by said sleeve and a stator mounted on a fixed support in operative position with respect to said bearing armature;
    (c) at least one electromagnetic rotor-position detector mounted on said fixed support independently from said at least one electromagnetic bearing, for controlling said electromagnetic bearing, said electromagnetic rotor-position detector including:
        (i) a reference surface formed on said rotor, said reference surface constituting a detector armature for said at least one electromagnetic rotor-position detector; and
        (ii) a stator removably mounted on said fixed support disposed directly opposite said reference surface on said rotor and independent from said sleeve.

2. A suspension system according to claim 1 in which the bearing and associated detector are axial.

3. A suspension system according to claim 1, in which the bearing and associated detector are radial.

4. A suspension system according to claim 1 comprising at least one radial electromagnetic end bearing associated with at least one radial electromagnetic detector, said at least one radial electromagnetic detector including a first stator and first armature, and an axial electromagnetic bearing associated with an axial electromagnetic detector, said axial electromagnetic detector including a second stator and second armature, each said at least one radial electromagnetic detector and said axial electromagnetic detector being mounted independently of the bearing it controls and said first and second stators of said at least one radial electromagnetic detector and said axial electromagnetic detector, respectively, being removably mounted on fixed support in operative position opposite associated annular reference surfaces formed on said rotor, wherein each said annular reference surface constitutes an armature for its respective detector.

5. A suspension system according to claim 2, in which the annular reference surface associated with said axial electromagnetic detector is flat and perpendicular to the longitudinal axis of the rotor and is constituted by a shoulder formed on the rotor.

6. A suspension system according to claim 3, in which the reference surface associated with the radial detector is constituted by a finished cylindrical surface portion of the rotor periphery suitable for accomodation in a roller bearing.

7. A suspension system according to claim 6, in which the radial detector is disposed within the sleeve below the radial bearing, substantially in the same radial plane as the radial plane of symmetry of the radial bearing.

8. A removable suspension system for a rotor having a finished surface portion disposed near an end portion thereof; comprising:
    (a) a sleeve, said sleeve including gripper means for selectively maintaining the rotor affixed therein;
    (b) at least one electromagnetic bearing including a bearing armature supported by said sleeve and a stator mounted on a fixed support in operative position with respect to said bearing armature;
    (c) at least one electromagnetic rotor position detector mounted on said fixed support independently from said at least one electromagnetic bearing for controlling said electromagnetic bearing; and
    (d) said electromagnetic rotor position detector including a stator mounted on said fixed support, said stator being disposed directly opposite said finished surface portion on said rotor whenever said rotor is affixed in said sleeve, said finished surface portion thereby forming a reference surface constituting the detector armature.

9. The suspension system of claim 8 wherein said formed reference surface is an integral formed portion of the rotor surface.

* * * * *